United States Patent [19]
Lawless

[11] Patent Number: 5,961,929
[45] Date of Patent: *Oct. 5, 1999

[54] TOP-MILLED CHANNELING FOR REMOVAL OF OXYGEN FROM AN OXYGEN GENERATOR

[75] Inventor: William N. Lawless, Westerville, Ohio

[73] Assignee: CeramPhysics, Inc., Westerville, Ohio

[ * ] Notice: This patent is subject to a terminal disclaimer.

[21] Appl. No.: 08/926,366

[22] Filed: Sep. 9, 1997

[51] Int. Cl.$^6$ ........................................................ C25B 9/00
[52] U.S. Cl. ........................ 422/121; 422/120; 422/122; 422/305; 55/523; 423/219; 423/579
[58] Field of Search ..................................... 422/120, 121, 422/122, 4, 305; 55/523; 423/219, 579

[56] References Cited

U.S. PATENT DOCUMENTS

| 3,837,724 | 9/1974 | Haberland et al. | 316/20 |
| 4,379,741 | 4/1983 | Sano et al. | 204/424 |
| 5,034,023 | 7/1991 | Thompson | 55/2 |
| 5,205,990 | 4/1993 | Lawless | 422/121 |

FOREIGN PATENT DOCUMENTS 0 809 313 A2  11/1997  European Pat. Off. .

OTHER PUBLICATIONS

PCT International Search Report, mailed Dec. 30, 1998, for PCT/US98/18709.

Primary Examiner—Terrence R. Till
Assistant Examiner—Fariborz Moazzam
Attorney, Agent, or Firm—Renner, Otto, Boisselle & Sklar, P.L.L.

[57] ABSTRACT

The present invention includes an oxygen generator having a ceramic honeycomb body. The honeycomb body includes one or more oxygen collection channels which extend laterally across a plurality of second channels in which oxygen is generated via the conduction of oxygen ions from a source gas residing in or passing through a plurality of first channels. The oxygen collection channels are located either positionally along a face of the generator, on one longitudinal end of the generator or are staggered about the side face such that the oxygen collection channels do not substantially impact the structural integrity of the honeycomb body. In addition, a method in which a honeycomb body having oxygen collection channels at its face includes extruding a ceramic body and forming one or more channels at a face of the extruded body. The method further includes forming electrodes within the body and sealing selected channels for the collection of oxygen.

20 Claims, 6 Drawing Sheets

TOP-MILLED CHANNELING FOR REMOVAL OF OXYGEN FROM AN OXYGEN GENERATOR

FIELD OF THE INVENTION

The present invention relates to an oxygen generator, and more particularly, to a device and method for separating oxygen from a source gas and channeling the generated oxygen out of the oxygen generator.

BACKGROUND OF THE INVENTION

Oxygen tends to move from a gas containing a high concentration of oxygen to one of lower concentration. If the two gases are separated from each other by an oxygen ion conductor, oxygen will dissociate on one surface of the conductor and absorb electrons to form oxygen ions. These oxygen ions can then diffuse through the ionic conductor, leaving the entry surface with a deficiency of electrons. Emerging on the exit or low oxygen concentration side of the ion conductor, oxygen ions give up electrons to form molecular oxygen, leaving the exit surface with an excess of electrons. Thus, an electrical potential difference, or EMF, is set up between the two surfaces of the ion conductor. The greater the difference in oxygen content of the two gases, the greater will be the tendency of oxygen to diffuse through the conductor, and the greater will be the potential difference between the entry and exit surfaces.

These basic principles underlie the operation of oxygen sensing devices, which are generally well known in the art. Oxygen sensors function by monitoring the EMF developed across an oxygen ion conductor which is exposed to gases having different oxygen partial pressures. The reciprocal principle underlies the operation of oxygen separators (also called oxygen generators) such as disclosed in U.S. Pat. No. 4,296,608. Voltage is applied to an oxygen ion conducting material and oxygen ions will be forced to flow across the material such that one gas will become richer in oxygen than the other, resulting in a basic oxygen generator. A physical structure for an oxygen generator composed of an oxygen ion conducting material is disclosed in U.S. Pat. No. 5,205,990 and is highlighted in prior art FIGS. 1–3 in the present application and the entire disclosure is hereby incorporated by reference.

In prior art FIG. 1, an oxygen generator 10 includes a ceramic honeycomb body 12 made of an oxygen ion conducting material, for example, bismuth oxide, having a first plurality of channels 14 and a second plurality of channels 16 extending therethrough from a front face 18 to a back face 20. The channels 14 and 16 are arranged in alternating rows, resembling a striped pattern laterally across faces 18 and 20 of the ceramic honeycomb body 12. The oxygen generator 10 further includes a voltage source 22 electrically connected to the channels 14 and 16 through electrode connectors 24 and 26 which are located on a top portion 28 of the ceramic honeycomb body 12, respectively. The connection methodology is such that each of the first channels 14 are electrically connected in parallel and each of the second channels 16 are also electrically connected in parallel. The voltage source 22 is operable to apply a voltage across the electrodes 24 and 26 such that a voltage potential is created across the first and second channels 14 and 16, thereby enabling oxygen ion conduction through the ceramic honeycomb body 12 from one channel to another.

The oxygen generator 10 receives a source gas 30 containing some oxygen, for example, air, into the first channels 14 which are open on both the front face 18 and back face 20 of the body 12. The oxygen ions pass through the oxygen ion conducting material of the body 12 from the first channels 14 to the second channels 16 which are sealed on both the front face 18 and back face 20 of the body 12. In this manner the source gas 30 contains more oxygen than an exit gas 32 from the back face 20 due to the conduction of oxygen ions into the second channels 16. The oxygen 34 within the second channels 16 is collected from a side face 36 of the body 12 via a plurality of third channels 38 which laterally intersect the second channels 16 approximately in the middle of the side face 36.

Prior art FIG. 2 is another oxygen generator 40 which employs the same basic structure as the oxygen generator 10 in prior art FIG. 1. FIG. 2, however, due to a fewer number of channels, is helpful in illustrating how the first and second channels 14 and 16 extend through the body 12 from the front face 18 to the back face 20. FIG. 2 also further illustrates the manner in which the second channels 16 are sealed at the front and back faces 18 and 20. The second channels 16 are sealed with plugs 42 on both the front face 18 and the back face 20 to prevent dilution or contamination of the generated oxygen in the second channels 16. FIG. 2 also illustrates the voltage potential that exists across the channels 14 and 16 via the "+" and "−" signs 43 resident on several of the channels via the voltage source 22 and the electrode connectors 24 and 26. Lastly, FIG. 2 illustrates in greater detail the third channels 38 that traverse the second channels 16 laterally and intersect the side face 36 at holes (or apertures) 44 which form a straight line pattern vertically along the side face 36 of the body 12.

The manner in which generated oxygen is removed from the second channels 16 in the prior art oxygen generators 10 and 40 of FIGS. 1 and 2 is illustrated in greater detail in prior art FIG. 3. Note that in FIG. 3 the orientation of the oxygen generator has been rotated 90 degrees such that the front face 18 and the back face 20 are located on the bottom and top of the figure, respectively. Each of the plurality of second channels 16 is sealed at the front and back faces with a plug 50 which extends laterally across each of the channels 16. Plug 50 seals the channels 16 in a manner similar to the individual plugs 42 of FIG. 2 and is illustrated as a single plug for ease of illustration. Either a single plug 50 or multiple plugs 42 have been used with prior art devices. The generated oxygen is collected through the hole 44 on the side face 36. Each of the channels 16 are intersected with holes 52 which align with the hole 44 such that oxygen 34 is collected from each of the channels 16. The holes 44 and 52, which extend through the body 12 to intersect each of the channels 16, are formed by drilling a hole through the side face 36. This hole, however, is drilled without knowledge of registry and problems may arise as is illustrated in prior art FIG. 4.

Prior art FIG. 4 illustrates a limitation of the prior art oxygen generators 10 and 40 of FIGS. 1 and 2. FIG. 4 illustrates the result of either poor registry of the honeycomb body 12 or errant drilling of holes 44 and 52 through the second channels 16 of the device. If the registry of the body 12 is poor, that is, if the striped, alternating pattern of first and second channels 14 and 16 is not straight, the holes 52 caused by drilling may not intersect each of the second channels 16, thereby resulting in an inefficient collection of oxygen since oxygen would not be collected from a channel 54. Worse, the holes 52 may even intersect a first channel 14 (not shown) which would fundamentally impair the device by contaminating the collected oxygen 34 in the second channels 16 with the first gas 30 (e.g., air) in the first channels 14.

Likewise, if registry of the body 12 is adequate and the hole drilled through the body 12 to intersect the channels 16 is skewed, a similar undesirable result will occur. The problem of poor registry or skewed hole drilling is further compounded by the fact that one cannot easily detect either problem since the honeycomb body 12 is a substantially closed structure (meaning that holes are drilled without knowledge of registry), thereby preventing an easy visual detection of either failure mode.

SUMMARY OF THE INVENTION

According to one aspect of the invention, an oxygen generator having a ceramic honeycomb body includes one or more oxygen collection channels (third channels) formed laterally across a plurality of second channels in which oxygen is generated via the conduction of oxygen ions from a source gas residing in a plurality of first channels. The oxygen collection channels are formed at a longitudinal end of one or more of the second channels so as to substantially improve the structural integrity of the ceramic honeycomb body. The collection channel location also prevents an intersection with any of the first channels and ensures that each of the second channels is intersected, thereby maximizing oxygen generation efficiency.

According to another aspect of the invention, a plurality of oxygen collection channels are formed laterally across a plurality of second channels in which oxygen is generated. Either some or all of the oxygen collection channels are laterally staggered with respect to one another along a vertical dimension of a side face of the ceramic honeycomb body such that the oxygen collection channels do not form a straight line vertically along the side face of the body. The staggered oxygen collection channels substantially improve the structural integrity of the ceramic honeycomb body. Alternatively, the channels are aligned, but not located at an approximate midpoint of the side face to thereby avoid large deformation or flexure forces at the oxygen collection channels.

In another aspect of the invention, an oxygen generator includes a honeycomb body made of an oxygen ion conductive material. A plurality of first and second channels defined by channel walls extend from inlet openings to outlet openings in the honeycomb body. The first channels receive a gas containing some oxygen and the second channels are sealed at both their inlet openings and outlet openings and extend generally in parallel to the first channels. Electrodes are disposed on the walls of the first and second channels and a means for electrically interconnecting the electrodes of the first channels as well as a means for electrically interconnecting the electrodes of the second channels is provided, and the first and second channels are electrically connected to a voltage source, respectively. One or more third channels extend laterally across the second channels and intersect at least one of the second channels. The one or more third channels are located at a longitudinal end of the second channels and provides an oxygen collection channel for the collected oxygen without substantially impacting the structural integrity of the honeycomb body.

In yet another aspect of the invention, a method of making an oxygen generator includes the steps of forming an oxygen ion conductive body having a plurality of first and second channels defined by channel walls extending from inlet openings to outlet openings defining longitudinal ends of the first and second channels. The method further includes forming a third channel at a longitudinal end of at least two of the second channels, thereby intersecting the at least two second channels. Electrodes are formed within the first and second channels and the second channels are sealed at the inlet and outlet openings. The step of forming the third channel may include milling a notch across the longitudinal end of the at least two second channels. In addition, the step of sealing the second channels may include forming a glass slurry, applying the glass slurry to the second channels at the longitudinal ends of the body and firing the body, thereby setting the glass slurry and forming a glass seal for the second channels.

The foregoing and other features of the invention are hereinafter fully described and particularly pointed out in the claims, the following description and the annexed drawings setting forth in detail one or more illustrative embodiments of the invention, such being indicative, however, of but a few of the various ways in which the principles of the invention may be employed.

DETAILED DESCRIPTION OF THE INVENTION

Figures 1, 2:
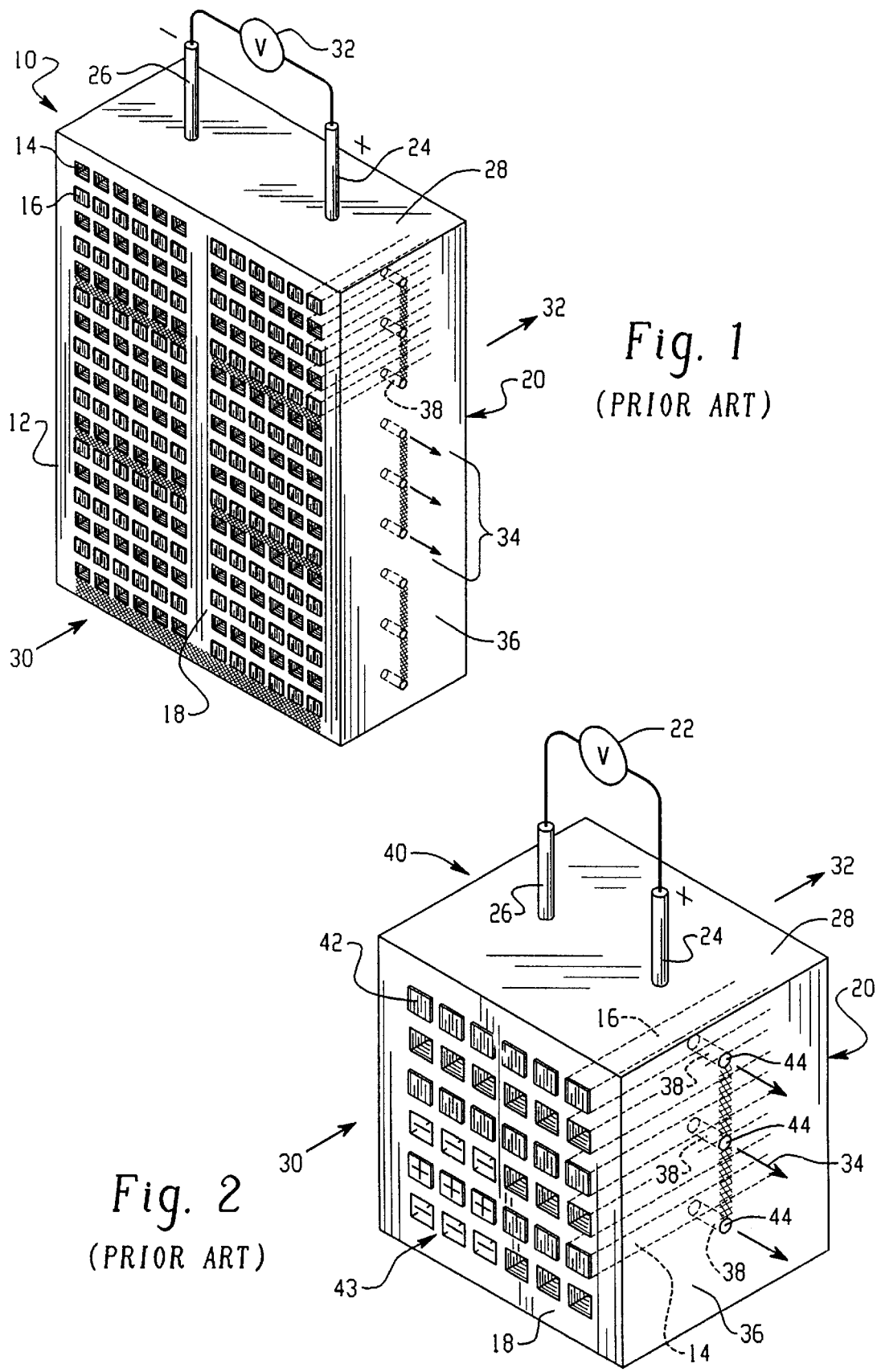
FIG. 1 is a perspective view of a prior art oxygen generating apparatus.
FIG. 2 is a perspective view of another prior art oxygen generating apparatus.
Figure 3:
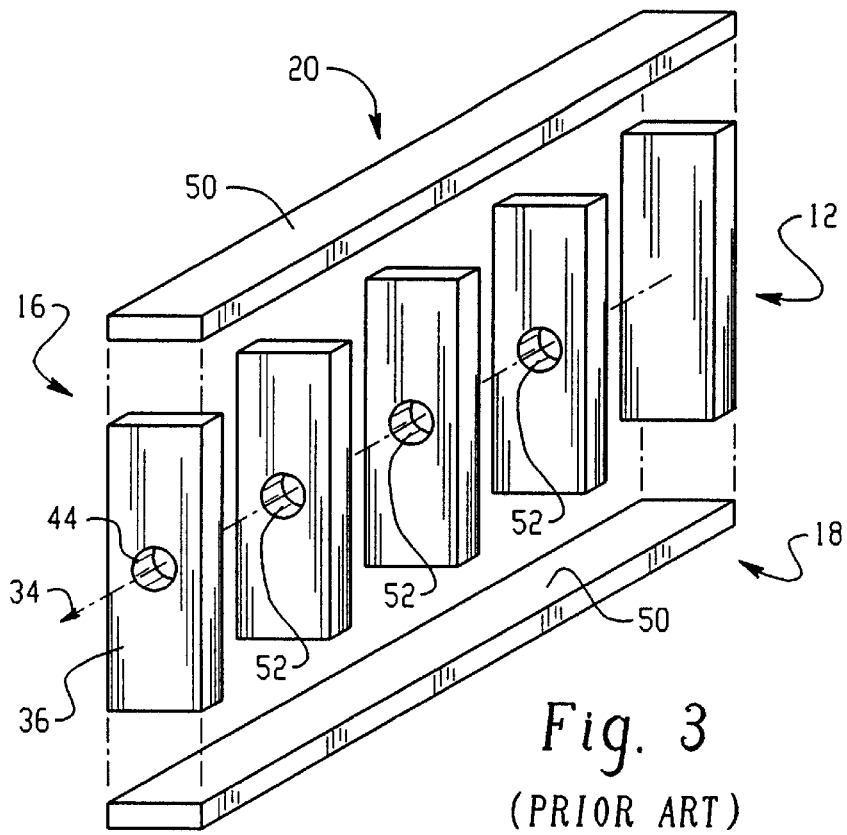
FIG. 3 is an exploded perspective view of a plurality of prior art second channels having holes which intersect the channels.
Figure 4:
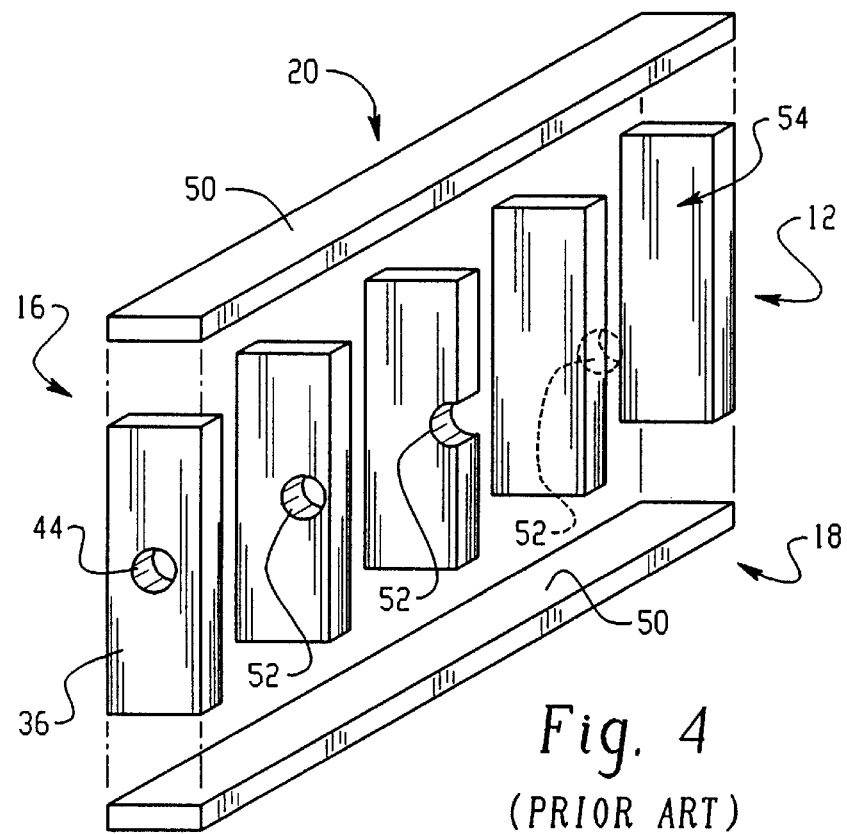
FIG. 4 is an exploded perspective view of a plurality of prior art second channels having either poor registry or skewed holes such that the holes fail to intersect each of the channels.

The present invention will now be described with reference to the drawings wherein like reference numerals are used to refer to like elements throughout. The oxygen generators 10 and 40 of prior art FIGS. 1 and 2 provide modest structural strength, but are not as strong as they could be due to the alignment of the holes 44 and 52 in the second channels 16 vertically along an approximate midpoint of the side face 36. With such an aligned hole arrangement, a weakening of the honeycomb body 12 occurs throughout its entire vertical dimension. Furthermore, the weakness resides on the side face approximately midway between the front and back faces 18 and 20 where the body 12 experiences the greatest amount of structural deformation and flexure due to externally applied forces. Therefore the prior art structures 10 and 40 may be susceptible to structural failure. The present invention overcomes the structural limitations of the prior art as will be discussed more fully below.

As will become apparent based on the following description, an oxygen generator having a ceramic honeycomb body includes one or more oxygen collection channels which extend laterally across a plurality of second channels in which oxygen is generated via the conduction of oxygen ions from a source gas residing in or passing through a plurality of first channels. The oxygen collection channels are located at one longitudinal end of the generator, are staggered about the side face or are aligned vertically along the side face away from its midpoint such that the oxygen collection channels do not substantially impact the structural integrity of the honeycomb body.

Figure 5:
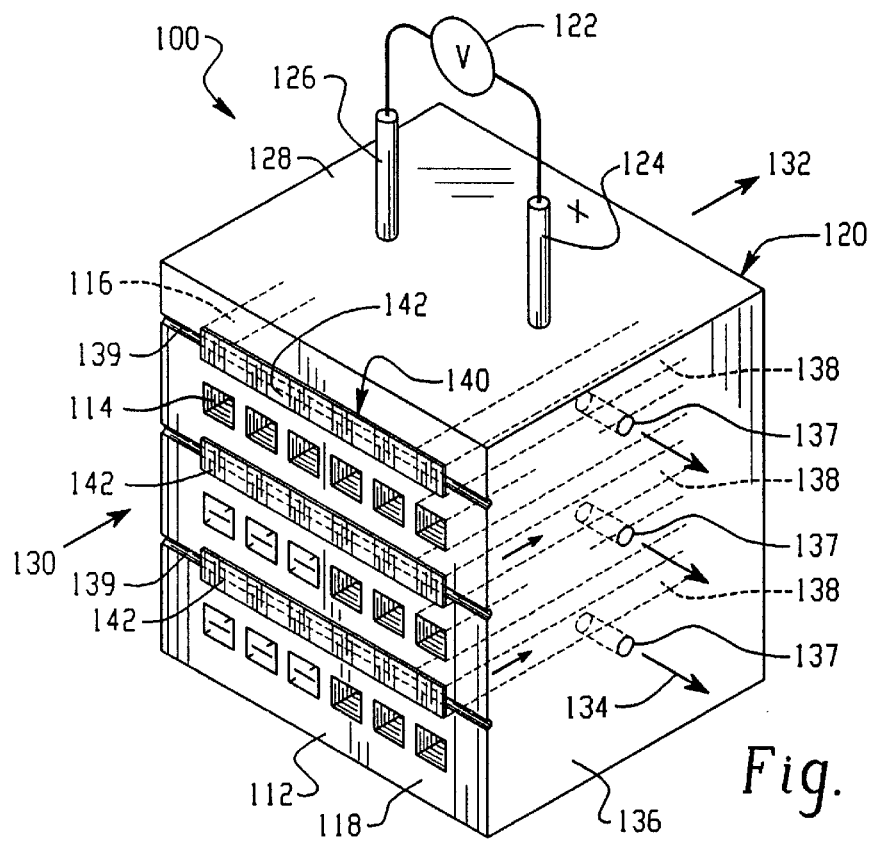
FIG. 5 is a perspective view illustrating an oxygen generator apparatus according to an embodiment of the present invention.

Turning now to FIG. 5, a perspective view of an oxygen generator 100 according to one embodiment of the present invention is illustrated. The oxygen generator 100 includes a ceramic honeycomb body 12 made of oxygen ion conducting material, for example, bismuth oxide, having a first plurality of channels 114 and a second plurality of channels 116 extending therethrough from a front face 118 to a back face 120. The channels 114 and 116 according to one embodiment of the present invention are arranged in alternating rows, resembling a striped pattern laterally across the faces 118 and 120 of the ceramic honeycomb body 112. The oxygen generator 100 further includes a voltage source 122 electrically connected to the channels 114 and 116 through electrode connectors 124 and 126 which are located on a top portion 128 of the ceramic honeycomb body 112, respectively. Each of the channels 114 and 116 have electrodes formed on their respective side walls. The connection methodology is such that each of the first channels 114 are electrically connected in parallel via their electrodes and each of the second channels 116 are also electrically connected in parallel via their electrodes. The voltage source 122 is operable to apply a voltage across the electrodes 124 and 126 such that a voltage potential is created across the first and second channels 114 and 116, thereby enabling oxygen ion conduction through the ceramic honeycomb body 112 from one channel to another.

The electrodes are formed within each of the first and second channels 114 and 116 and preferably comprise thin coatings of a conductive material (e.g., platinum) along side walls of each channel. Due to the thin nature of the electrode coatings, the electrodes within the Figure are not highly visible as discrete coatings in the Figures. Various connection methodologies may be utilized to interconnect the electrodes within the first and second channels 114 and 116, respectively. One manner of doing so is to attach wires that cross the first and second channels 114 and 116, respectively at the front or back faces 118 and 120 to thereby make electrical contact to the electrodes within the channels such that all the first channels 114 are connected in parallel and all the second channels 116 are connected in parallel while maintaining the first and second channels 114 and 116 electrically isolated from one another. Another method of interconnecting the electrodes would be to cover the front and back faces 118 and 120 of the body 112 with a conductive film or coating in conjunction with a mask such that on the front face 118, for example, the first channels 114 would be interconnected via the conductive film contacting the electrodes while isolating the second channels 116 via the mask. Similarly, on the back face 120 the second channels would be interconnected while isolating the first channels 114 with a mask. In yet another embodiment, a combination of the above methods may be utilized. Any structurally or functionally equivalent means for interconnecting the electrodes is contemplated to fall within the scope of the present invention.

The oxygen generator 100 receives a source gas 130 containing some oxygen, for example, air, into the first channels 114 which are open on both the front face 118 and the back face 120 of the body 112. The oxygen ions pass through the oxygen ion conducting material of the body 112 from the first channels 114 to the second channels 116 which are sealed on both the front face 118 and back face 120 of the body 112 when a voltage is applied (via the voltage source 122) across the electrodes within the channels 114 and 116. In this manner the source gas 130 contains more oxygen than an exit gas 132 due to the conduction of oxygen ions into the second channels 116. The oxygen 134 within the second channels 116 is collected from a side face 136 of the body 112 via a plurality of holes (or apertures) 137 which laterally intersect the second channels 116 that are nearest the side face 136. The holes 137, however, only intersect the second channels that are nearest the side face 136 (that is, the channels 138). Instead, oxygen within each of the second channels 116 is channeled to the second channels 138 nearest the side face having the holes 137 via a plurality of third channels (which alternatively may be called oxygen collection channels) 139 which laterally intersect two or more of the second channels at a longitudinal end 140 of each of the second channels 116.

The third channels 139, in this particular embodiment, run along the entire front face 118 of the body 112. Alternatively, however, the channels 139 may run along the back face 120 of the body 112 such that the channels 139 are located at the other longitudinal end of the second channels 116.

The second channels 116 are sealed at the front and back faces 118 and 120 with plugs 142 which prevent generated oxygen from leaking out of the generator 100 at either of the faces 118 and 120 and helps direct the oxygen along the third channels 139. Preferably, the plugs 142 are beaded glass formed from a slurry which is sufficiently dense so as not to wick into the third channels 139 and subsequently fired. Alternatively, however, any insulating material may be used (e.g., a ceramic plug), although materials having a coefficient of expansion substantially similar to that of the body 112 work most reliably and are therefore preferred.

According to the oxygen generator structure 100 of FIG. 5, oxygen 134 which is generated in the second channels 116 due to oxygen ion conduction through the body 112 from the first channels 114 flows within the second channels 116 to the longitudinal end 140 of the body 112. The oxygen is prohibited from exiting the body 112 via the plugs 142 in the front face 118 and back face 120 and instead enters the third channels 139 and flows laterally across the front face 118 of the body 112 within the third channels 139 and enters the second channels 138 that are nearest the side face 136. The oxygen is then collected from the second channels 138 via the plurality of holes 137 which operate as oxygen output ports. In this particular embodiment, the holes 137 are illustrated on the side face 136 at approximately the midpoint between the front and back faces 118 and 120. Alternatively, the holes 137 may be located at any location along the side face 136 of the body 112.

Figure 6:
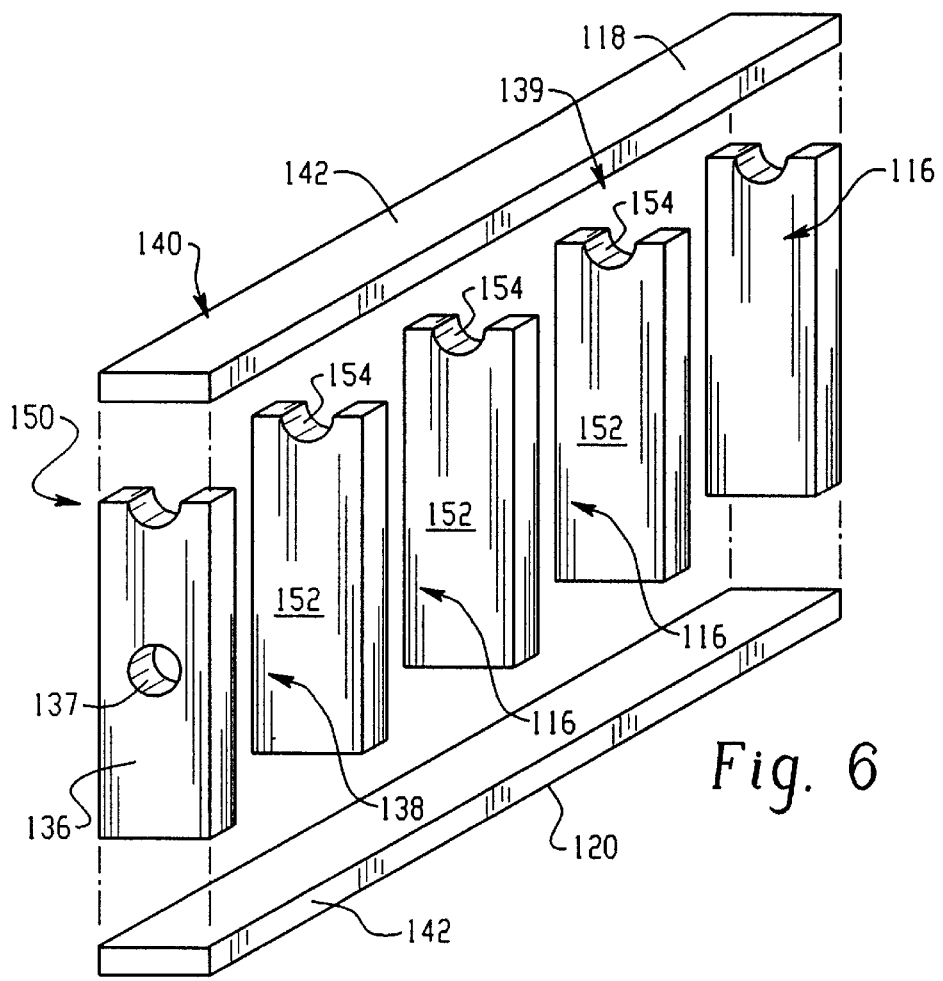
FIG. 6 is an exploded perspective view according to one embodiment of the invention.

The third channels 139 located at the longitudinal end 140 of the body 112 is illustrated in greater detail in FIG. 6. FIG. 6 is an exploded perspective view of a portion 150 of the body 112 illustrating one lateral row of second channels 116. Note that the orientation of the body 112 has been rotated 90 degrees with respect to FIG. 5 for ease of illustration. The second channels 116 are separated by side walls 152 made of oxygen ion conducting material that are covered or coated with a conductive material to form electrodes, wherein each side wall 152 has a notch 154 at the longitudinal end 140 which, upon being enclosed by the plugs 142, forms the third channel 139 for oxygen collection. The channel 138 that is nearest the side face 136 has the hole 137 for removal of the oxygen 134 from the oxygen generator. Note that FIG. 6 illustrates only one lateral row of second channels 116 and that the invention contemplates one or more lateral rows of second channels 116 (see, for example, FIG. 5 having multiple lateral rows of second channels 116, wherein each of the rows of second channels 116 has a third channel 139 traversing the row laterally at the longitudinal end 140).

Figure 7:
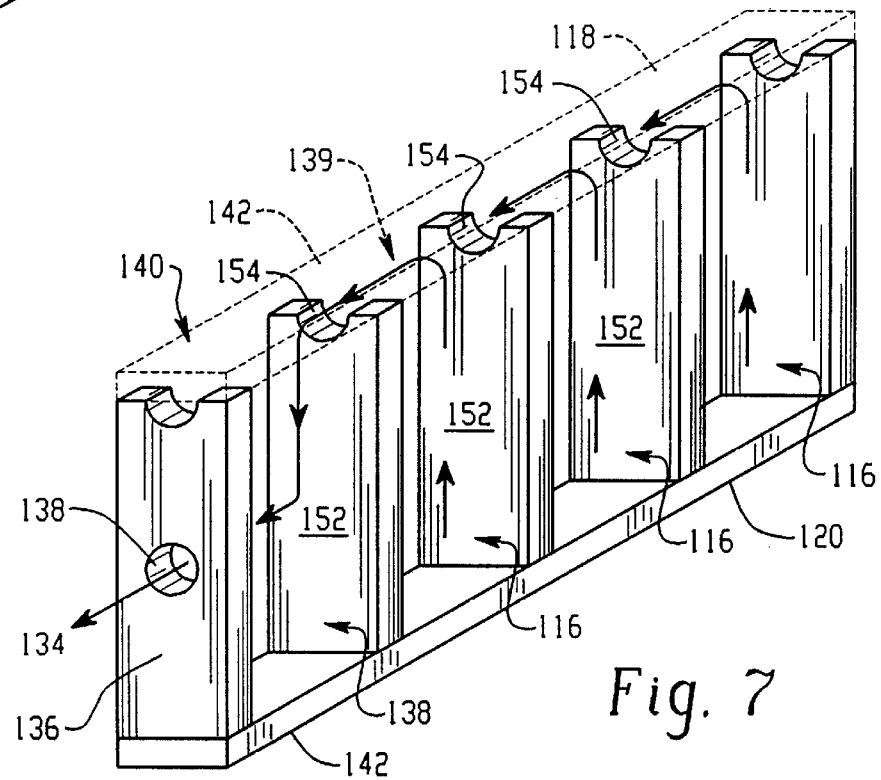
FIG. 7 is a perspective view illustrating fluid flow according to one embodiment of the invention.

The manner in which oxygen is collected through the third channels 139 is illustrated in greater detail in FIG. 7. In FIG. 7, the plugs 142 are in physical contact with the side walls 152. The locations in which the notches 154 contact the plugs 142 form the third channel 139 at the longitudinal end 140 of the second channels 116. Oxygen 134 which is collected from the first channels 114 (not shown) through the oxygen ion conductive walls 152 flows in the direction of the arrows within each of the second channels 116 toward the longitudinal end 140. Once the oxygen 134 reaches the longitudinal end 140, it travels laterally across the channels 116 through the third channel 139 into the second channel 138 which is nearest the side face 136 and then exits the generator 100 through the hole 137.

The third channel 139 located at the longitudinal end 140 of the second channels 116 as illustrated in FIGS. 5–7 solve several problems experienced by the prior art oxygen generators 10 and 40 of FIGS. 1 and 2. Since the channel 139 is at the longitudinal end 140, one can visually examine the channel 139 prior to inserting or attaching the plugs 142 to ensure that each second channel 116 has been properly intersected by the third channel 139. In this manner one can ensure maximum efficiency of oxygen collection from each of the second channels independently of whether registry of the honeycomb body 112 is good because one can visually inspect the third channel 139 prior to inserting or attaching the plugs 142. In the same manner, since the third channels 139 are at the longitudinal end 140 of the second channels 116, one can ensure that the third channels 139 do not intersect any of the first channels 114. The ability to visually examine the body 112 before, during and after the formation of the third channels 139 also prevents the skewing of the channels 139 since the channels 139 are not formed blindly.

Figure 8:
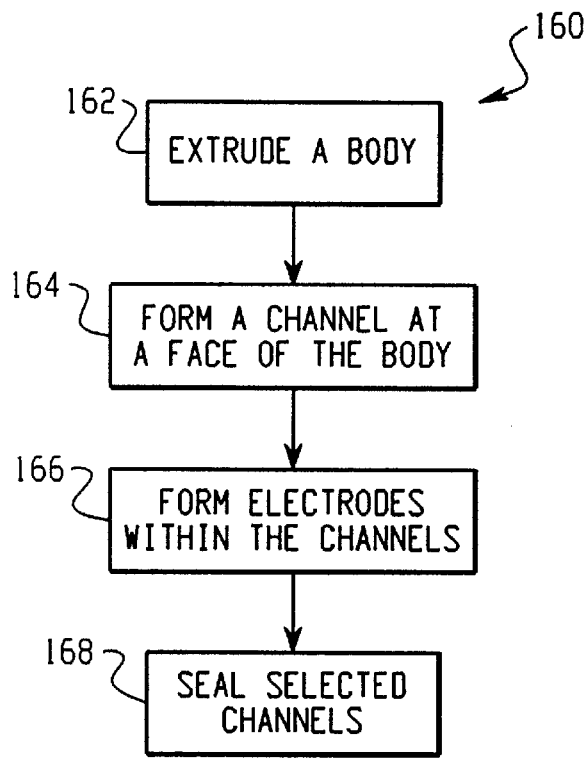
FIG. 8 is a flow chart diagram illustrating a method of forming an oxygen generator according to one embodiment of the present invention.

The oxygen generator 100 of FIGS. 5–7 may be constructed via a method 160 which is illustrated in FIG. 8, a description of which follows below. FIG. 8 illustrates a flowchart diagram which highlights the method 160 of forming an oxygen generator 100 as illustrated in FIG. 5. Initially, a honeycomb body composed primarily of an oxygen ion conducting material (e.g., bismuth oxide) is formed (by extrusion, for example) at step 162 to form a honeycomb body having a plurality of channels extending therethrough from a front face to a back face. Preferably, the plurality of channels are generally parallel to one another and, as discussed earlier in conjunction with FIG. 5, the plurality of channels formed by the extrusion form a plurality of first and second channels, respectively, in a laterally striped pattern.

Subsequently, one or more third channels are formed at a longitudinal end of one or more of the plurality of second channels at step 164. Since the second channels extend from the front face to the back face of the body, the above-mentioned longitudinal end of the body may be either at the front face or the back face of the body. Therefore the one or more third channels may be formed at either face of the body. This feature is highly advantageous over the prior art since one may visually inspect either the front or back face of the body while the third channels are being formed, thereby ensuring that the third channels properly intersect their respective second channels and that the third channels do not intersect any of the first channels.

A preferred method for forming the one or more third channels includes milling a notch along the longitudinal ends of the second channels. Alternatively, other methods of forming the third channels are also contemplated by the present invention, including but not limited to cutting or drilling the notches or using a chemical etchant and mask process at either the front or back face of the body. Further, although preferably the third channels are formed at either the front or the back face of the body, third channels may alternatively be formed at both the front and back faces of the honeycomb body. The third channels are formed while the body is still in its green state. Subsequently, the body is put into a furnace and sintered at approximately 1000–1100C for about 1 to 4 hours to thereby create a monolithic ceramic body.

After the third channels are formed at step 164 and the body is sintered, electrodes are formed within the plurality of first and second channels at step 166 such that each of the channels is substantially coated with a conductive material. Various methods for forming such electrodes within the channels exist and are contemplated by the present invention. One such method includes placing the extruded body into a reservoir containing a conductive material, for example platinum (a slurry of platinum powder). A pump connected to the reservoir recirculates the liquid platinum within the reservoir, thereby drawing the platinum through the plurality of first and second channels, respectively. The body is then fired to set the electrodes as conductive films within the channels of the body.

The plurality of second channels are then sealed at step 168 with an insulating material. The sealing material is preferably an electrically insulating material to prevent conduction between the electrodes within the second channels and conductive materials external to the honeycomb body. The sealing material may include a single plug or multiple plugs made of a ceramic material or alternatively may include an insulative glass material. The seal provides gas tight conditions in the body to prevent gas dilution or leakage. In any event, it is desirable that any sealing material have a coefficient of expansion that approximates that of the body such that the sealing material is effective as a sealant over a broad range of temperatures.

Figure 9:
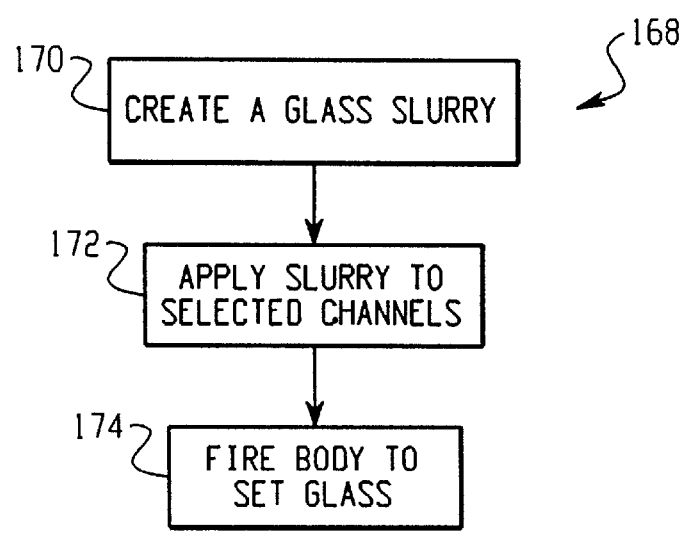
FIG. 9 is a flow chart diagram illustrating one method of sealing selected channels of the honeycomb body.

A method for sealing the second channels with a glass material is described in greater detail in conjunction with FIG. 9. Initially, a glass slurry is created at step 170 consisting of a mixture of a commercially available ground glass compound and isopropyl alcohol, mixed to a consistency sufficiently viscous so that when applied to the second channels having notches at their longitudinal ends, the slurry does not appreciably wick into the channels. In this manner the third channels formed by the notches will not be obstructed by the glass slurry. Subsequently, the glass slurry is applied to the selected channels, namely the plurality of second channels, at step 172 and the body is then fired at step 174 to thereby set the glass and seal the channels. The glass sealing material is favorable since it flows as a slurry prior to firing and thereby provides a good seal, but may be made sufficiently dense (and therefore more viscous) so as to prevent substantial wicking into the notches forming third channels across the second channels.

Figure 10:
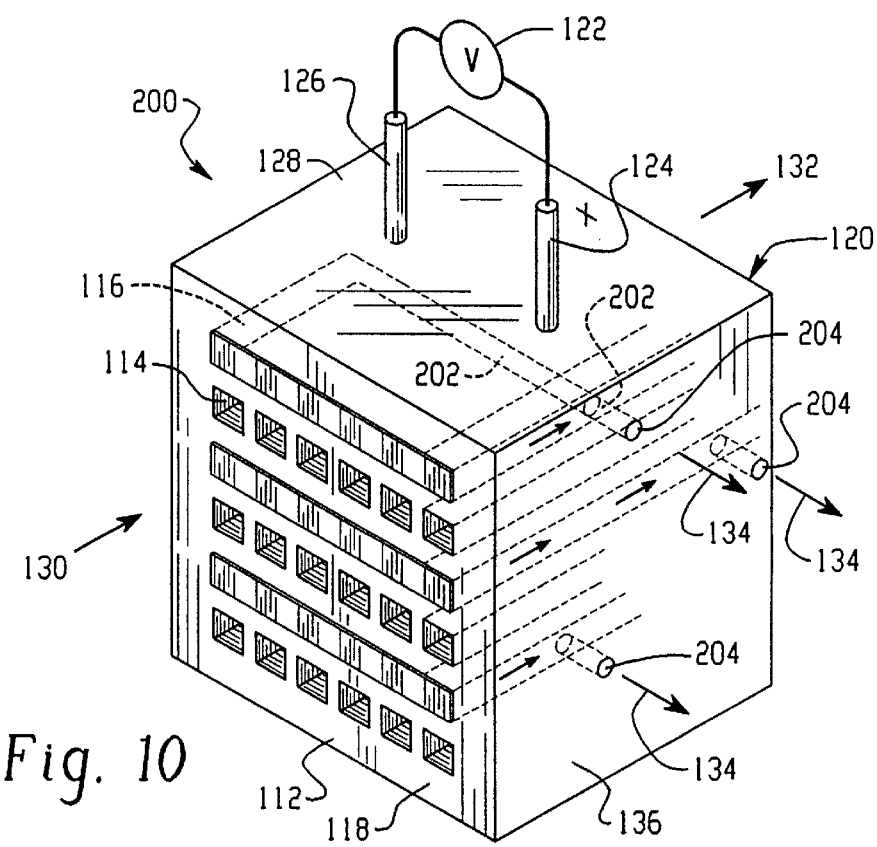
FIG. 10 is a perspective view illustrating an oxygen generator apparatus according to another embodiment of the present invention.

FIG. 10 is an oxygen generator 200 according to another embodiment of the invention. The oxygen generator 200 is similar to the generator 100 of FIG. 5 in several respects, but differs in the following manner. The generator 200 does not incorporate channels at a longitudinal end of the second channels 116, instead the third channels 202 (shown in phantom) extend throughout the body 112 at a position indicated by the holes (or apertures) 204 in the side face 136 (which are not necessarily at the longitudinal end of the second channels 116). Therefore the third channels 202 are similar in one respect to prior art generators 10 and 40 of FIGS. 1 and 2, but substantially differ from the prior art generators 10 and 40 in that the third channels 202 are not aligned vertically along the side face 136, but rather are laterally staggered from one another. In this manner the staggered channels 202 do not create a substantial weakening of the body 112 at any one position.

Although FIG. 10 illustrates all of the holes 204 and channels 202 staggered from one another, the present invention contemplates any configuration in which at least one channel 202 is staggered from the others since even minimal staggering of the channels 202 still provides an incremental improvement in the structural integrity of the body 112. Any configuration of channels 202 and holes 204 in which they are not all aligned vertically falls within the scope of the present invention.

Figure 11:
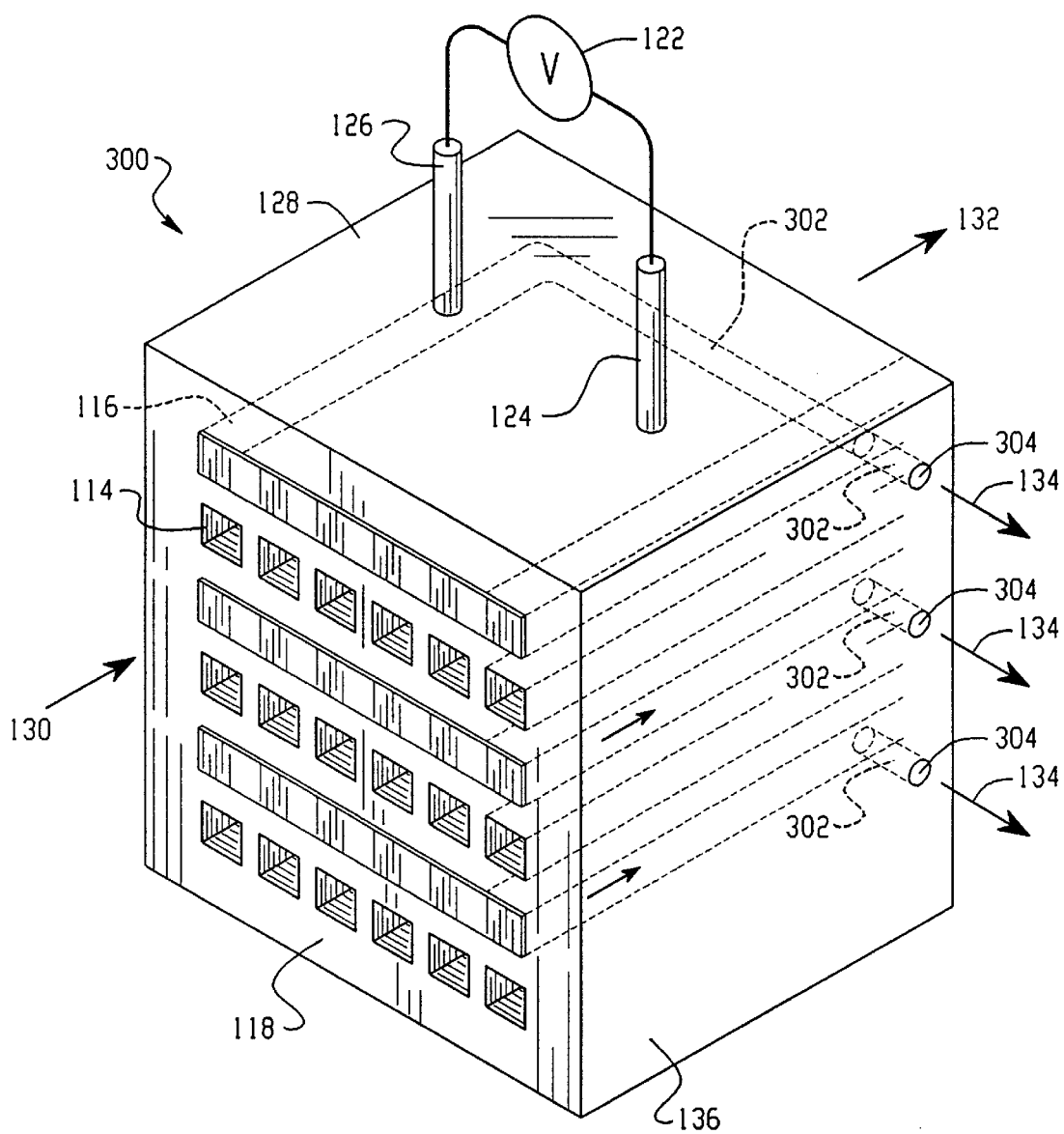
FIG. 11 is a perspective view illustrating an oxygen generator apparatus according to yet another embodiment of the present invention.

FIG. 11 is an oxygen generator 300 according to yet another embodiment of the invention. The oxygen generator 300 has the first and second plurality of channels 114 and 116 that extend between the front and back faces 118 and 120 of the honeycomb body 112. A plurality of third channels 302 having holes (or apertures) 304 which intersect the side face 136 are substantially aligned vertically thereon. The substantially aligned third channels 302 differ from the third channels of prior art generators 10 and 40 of FIGS. 1 and 2 in that the channels 302 are not located on the side face 136 at an approximate midpoint between the front and back faces 118 and 120. Therefore the third channels 302 are not located at a region of the body 112 which experiences the greatest flexure and deformation forces, thereby improving the structural reliability of the body 112.

Although the invention has been shown and described with respect to a certain preferred embodiment or embodiments, it is obvious that equivalent alternations and modifications will occur to others skilled in the art upon the reading and understanding of this specification and the annexed drawings. In particular regard to the various functions performed by the above described components (assemblies, devices, compositions, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments, as may be desired and advantageous for any given or particular application.

What is claimed is:

1. An oxygen generator, comprising:
an oxygen ion conductive body;
a plurality of first and second channels defined by channel walls, extending from inlet openings to outlet openings in the body, thereby defining longitudinal ends of the first and second channels, wherein the first channels receives a first gas containing some oxygen and wherein the second channels are sealed at the inlet and outlet openings and extend generally parallel to the first channels;
electrodes disposed on the channel walls of the first and second channels;
means for electrically interconnecting the electrodes in the first channels;
means for electrically interconnecting the electrodes in the second channels;
a voltage source electrically connected to the electrodes; and
a third channel intersecting at least two of the second channels, wherein the third channel is located at a longitudinal end of the second channels and is formed by removing oxygen ion conducting material from the body corresponding to the at least two second channels and sealing the at least two second channels with a glass sealing material, thereby providing an outlet channel for collected oxygen without substantially impacting the structural integrity of the body.

2. The oxygen generator of claim 1, wherein the plurality of first and second channels are arranged in a laterally striped pattern.

3. The oxygen generator of claim 1, wherein the third channel collects oxygen from the second channels it intersects into a second channel having an outlet port.

4. The oxygen generator of claim 1, further comprising a plurality of third channels, wherein each of the plurality of third channels intersects several of the second channels such that oxygen within each of the second channels is collected with the third channels.

5. The oxygen generator of claim 1, wherein the longitudinal end comprises a region interposed between the inlet opening of the body and the glass sealing material.

6. The oxygen generator of claim 1, wherein the longitudinal end comprises a region interposed between the outlet opening of the body and the glass sealing material.

7. The oxygen generator of claim 1, wherein the third channel comprises a notch formed at the longitudinal end of the second channels.

8. The oxygen generator of claim 1, wherein the glass sealing material has approximately the same coefficient of expansion as the body.

9. An oxygen generator, comprising:
a honeycomb body comprised of an oxygen ion conductive material;
a plurality of first and second channels defined by channel walls, wherein the first channels extend from inlet openings to outlet openings in the honeycomb body to receive a first gas containing some oxygen and wherein the second channels are sealed at their longitudinal ends and extend generally in parallel to the first channels;
electrodes disposed on walls of the first and second channels;
means for electrically interconnecting the electrodes in the first channels;
means for electrically interconnecting the electrodes in the second channels;
a voltage source electrically connected to the electrodes; and a plurality of third channels, wherein each third channel extends laterally with respect to and intersects at least two of the second channels, and wherein at least one of the third channels is staggered horizontally with respect to the other third channels along a vertical dimension of the honeycomb body, thereby strengthening the structural integrity of the honeycomb body.

10. An oxygen generator, comprising:

a honeycomb body comprised of an oxygen ion conductive material;

a plurality of first and second channels defined by channel walls, wherein the first channels extend from inlet openings to outlet openings in the honeycomb body to receive a first gas containing some oxygen and wherein the second channels are sealed at their longitudinal ends and extend generally in parallel to the first channels;

electrodes disposed on walls of the first and second channels;

means for electrically interconnecting electrodes in the first channels;

means for electrically interconnecting the electrodes in the second channels;

a voltage source electrically connected to the electrodes; and a plurality of third channels, wherein each third channel extends laterally with respect to and intersects at least two of the second channels, and wherein the third channels are substantially aligned along a vertical dimension of the body away from a midpoint between the inlet and outlet openings, thereby strengthening the structural integrity of the honeycomb body.

11. A method of making an oxygen generator, comprising the steps of:

forming an oxygen ion conductive body having a plurality of first and second channels defined by channel walls extending from inlet openings to outlet openings defining longitudinal ends of the first and second channels;

forming a third channel at a longitudinal end of at least two of the second channels, thereby intersecting the at least two second channels;

forming electrodes within the first and second channels; and sealing the second channels at the inlet and outlet openings with a glass sealing material.

12. The method of claim 11, wherein the step of forming an oxygen ion conductive body comprises extruding the body.

13. The method of claim 11, wherein the step of forming the third channel comprises milling a notch across the longitudinal ends of the at least two second channels.

14. The method of claim 11, wherein forming electrodes within the first and second channels comprises the steps of:

placing the body into a reservoir containing a conductive liquid; and flowing the conductive liquid through the first and second channels, thereby coating the first and second channels with a conductive film.

15. The method of claim 13, wherein the step of flowing the conductive liquid through the first and second channels further comprises recirculating the conductive liquid in the reservoir, thereby drawing the conductive liquid through the first and second channels of the body.

16. The method of claim 14, further comprising the step of firing the body, thereby setting the conductive film within the first and second channels of the body to form electrodes.

17. The method of claim 11, wherein the step of sealing the second channels with the glass sealing material comprises the steps of:

forming a glass slurry;

applying the glass slurry to the second channels at the longitudinal ends of the body; and firing the body, thereby setting the glass slurry and forming the glass sealing material.

18. The method of claim 17, wherein the glass slurry is sufficiently dense so as not to substantially wick into the third channel at the longitudinal end of the body.

19. The method of claim 11, further comprising a plurality of third channels at the longitudinal ends of the second channels, thereby intersecting each of the second channels with a third channel for collection of oxygen.

20. An oxygen generator, comprising:

an oxygen ion conductive body;

a plurality of first and second channels defined by channel walls, extending from inlet openings to outlet openings in the body, thereby defining longitudinal ends of the first and second channels, wherein the first channels receives a first gas containing some oxygen and wherein the second channels are sealed at the inlet and outlet openings and extend generally parallel to the first channels;

electrodes disposed on the channel walls of the first and second channels;

means for electrically interconnecting the electrodes in the first channels;

means for electrically interconnecting the electrodes in the second channels;

a voltage source electrically connected to the electrodes; and a third channel intersecting at least two of the second channels, wherein the third channel is located at a longitudinal end of the second channels where there is an absence of oxygen ion conducting material, and a glass sealing material sealing the at least two second channels and forming part of the third channel, thereby providing an outlet channel for collected oxygen without substantially impacting the structural integrity of the body.

* * * * *